May 13, 1952     R. K. MUELLER     2,596,711

ELECTROMAGNETIC APPARATUS

Original Filed March 7, 1946

INVENTOR.
Robert K. Mueller
BY Kenway Jenney
Witter & Hildreth
Attys.

Patented May 13, 1952

2,596,711

UNITED STATES PATENT OFFICE 2,596,711

ELECTROMAGNETIC APPARATUS

Robert K. Mueller, Newton, Mass., assignor, by mesne assignments, to Research Corporation, New York, N. Y., a corporation of New York Original application March 7, 1946, Serial No. 652,523. Divided and this application August 5, 1949, Serial No. 108,751

2 Claims. (Cl. 172—36)

The present invention relates to electromagnetic apparatus, and more particularly to torque motors and related devices. This application is a division of my co-pending application No. 652,523, dated March 7, 1946, now Patent No. 2,488,734, granted November 22, 1949.

In general any motor can be classed as a torque motor, but the term is usually applied to a motor which is not continuously rotatable and in particular cases is capable of movement through only a relatively small angle. Such motors are useful in servo-mechanisms and in other applications requiring a precisely determined torque dependent on an electrical input.

The object of the present invention is to provide a torque motor in which the torque is substantially independent of the position of the rotor, but varies in accordance with the inputs to two electrical circuits. With this object in view, the present invention comprises the apparatus hereinafter described and particularly defined in the claims.

Figure 1:
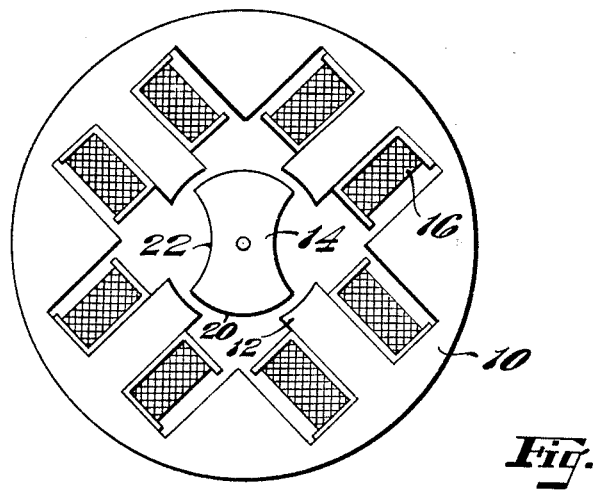
Figure 2:
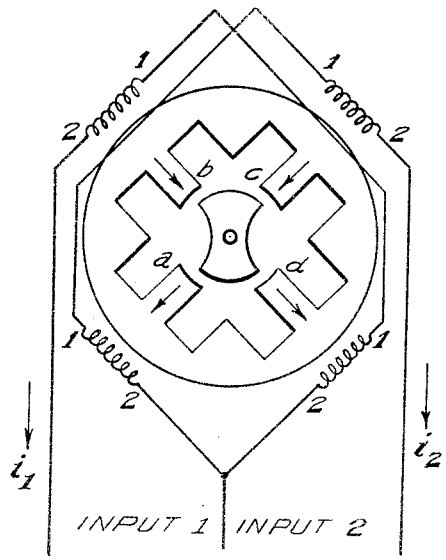

In the accompanying drawings, Fig. 1 is an elevation of the preferred form of apparatus according to the present invention; Fig. 2 is a diagram of the magnetomotive force pattern of the apparatus shown in Fig. 1.

The device shown in Fig. 1 comprises a stator 10, preferably constructed of laminations of magnetic material. The stator is circular and has four re-entrant poles 12. A rotor 14 is pivoted or journaled in suitable bearings about an axis at the center of the stator frame. Each pole 12 is provided with a winding 16.

The rotor is of magnetic material, such as soft iron, and is not magnetized; nor does it carry any windings. It has circular end portions 20, each spanning the distance between centers of two adjacent poles. The pole faces are formed to provide an accurately uniform air gap with relation to the ends of the rotor. The sides 22 of the rotor are not of critical shape and are conveniently formed as circular arcs tangent to the radii drawn to the extreme edges of the circular end portions 20. The normal or neutral position of the rotor is with its edges at the centers of the pole faces as indicated in Fig. 1.

In Fig. 2 the four poles are designated consecutively by the letters $a$, $b$, $c$ and $d$. The coils associated with poles $a$ and $c$ are connected in series to form one circuit; the coils associated with poles $b$ and $d$ are connected in series to form a second circuit. For simplicity the coils are shown as arranged outside the frame, but it will be understood that they are wound on the pole pieces as shown in Fig. 1. A convention designating the directions of the magnetomotive forces is necessary. The ends of each coil are designated 1 and 2. The convention is that when current flows in a coil from point 1 to point 2 the magnetomotive force due to the coil is inward toward the rotor, and when the current flows from 2 to 1 the magnetomotive force is outward away from the rotor. Thus in Fig. 2 the magnetomotive forces are inward for poles $b$ and $c$ and outward for poles $a$ and $d$.

The current flowing through coils $a$ and $c$ is designated as $i_2$; the current through coils $b$ and $d$ is $i_1$. The currents may be either direct current or alternating current of the same frequency.

The torque tending to move the rotor from neutral position is proportional to $(i_1+i_2)(i_1-i_2)$. The fact that the torque is dependent on sum and difference terms makes the arrangement convenient for application in some electronic circuits and servo-mechanisms.

The torque is substantially constant over the range of motion for which fringing effects are negligible. In general only a few degrees of motion are required, say ten or twenty degrees, at the most. Within that range a remarkably uniform torque is obtained. It will be understood that if the torque is unresisted the rotor will move until it is centered with respect to one opposed pair of poles. In most applications, however, the torque is resisted by other torques and only a small range of motion is permitted.

For an explanation of the theory involved in the operation of this device, reference will be made to Fig. 2. It should first be noted that there is no mutual inductance between the coils through which $i_1$ flows and the coils through with $i_2$ flows, because neither of the coils in either circuit is linked by flux produced by the other circuit.

Since there is no mutual inductance, any torque produced must be due to self inductance. In calculating the self-inductance of the two circuits, it can be assumed that the reluctance of the magnetic paths is due entirely to the air gaps. If the rotor turns in clockwise direction through an angle $\theta$, the reluctance of the magnetic path through poles $a$ and $c$ can be expressed as $$\frac{1}{a-b\theta}$$

where $a$ and $b$ are constants. The flux through coils $a$ and $c$ is $$2Ni_2\,(a-b\theta)$$

where N is the number of turns per coil. Similarly, the flux $\phi$ through poles $b$ and $d$ is $$2Ni_1(a+b\theta)$$

The total inductance of circuit 1 is $$\frac{N\phi}{i} \text{ or } 4N^2(a+b\theta)$$

The total inductance of circuit 2 is $$4N^2(a-b\theta)$$

The magnetic energy stored in circuit 1 is $$2N^2i_1^2(a+b\theta)$$

The magnetic energy stored in circuit 2 is $$2N^2i_2^2(a-b\theta)$$

The total magnetic energy (E) stored in both circuits is $2N^2a(i_1^2+i_2^2)+2N^2b\theta(i_1^2-i_2^2)$.

The torque produced equals $$\frac{dE}{d\theta}$$

or $2N^2b(i_1^2-i_2^2)$, or $2N^2b(i_1+i_2)(i_1-i_2)$, as heretofore stated.

The use of the torque motor herein described as part of a servomechanism is described in my above-mentioned patent. It will be understood that the present invention is not limited to the constructions described in either the present invention or my patent, but may be embodied in other forms.

Having thus described my invention, I claim:

1. A dynamo transformer comprising a stator having four symmetrically disposed poles, a rotor of magnetic material pivoted within the stator and having two end faces spanning substantially the angle between centers of adjacent poles, the rotor having a neutral axis which lies substantially halfway between the poles and being capable of only limited movement with respect to said neutral axis, and two sets of stator windings, one set of windings being associated with two opposite poles and being connected to produce a magnetomotive force inward in one pole and outward in the opposite pole, the other set of windings being associated with the other two poles and being connected to produce a magnetomotive force inward in one pole and outward in the opposite pole.

2. A dynamo transformer comprising a stator having four symmetrically disposed poles, a rotor of magnetic material pivoted within the stator and having two end faces spanning substantially the angle between centers of adjacent poles, the rotor having a neutral axis which lies substantially halfway between the poles and being capable of only limited movement with respect to said neutral axis, and two sets of stator windings, one set of windings being associated with two opposite poles and being connected to produce a magnetomotive force inward in one pole and outward in the opposite pole, the other set of windings being associated with the other two poles and being connected to produce a magnetomotive force inward in one pole and outward in the opposite pole, the self-inductance of each set of windings bearing a substantially linear relationship to the displacement of the rotor from the neutral position midway between two poles and the mutual inductance of the two sets of windings being substantially zero for all positions of the rotor.

ROBERT K. MUELLER.

REFERENCES CITED

The following references are of record in the file of this patent:

UNITED STATES PATENTS

| Number | Name | Date |
|---|---|---|
| 1,610,546 | Brandecker | Dec. 14, 1926 |
| 1,695,264 | Adams | Dec. 18, 1928 |
| 1,881,394 | Aull | Oct. 4, 1932 |